United States Patent
Oyama et al.

(10) Patent No.: US 10,962,142 B2
(45) Date of Patent: Mar. 30, 2021

(54) VALVE STEM SEAL

(71) Applicant: NOK CORPORATION, Tokyo (JP)

(72) Inventors: Takayuki Oyama, Fujisawa (JP);
Nobuhiro Nishimura, Fukushima (JP);
Hiroshi Onodera, Fukushima (JP);
Masamichi Kishiro, Fukushima (JP)

(73) Assignee: NOK CORPORATION, Tokyo (JP)

( * ) Notice: Subject to any disclaimer, the term of this patent is extended or adjusted under 35 U.S.C. 154(b) by 181 days.

(21) Appl. No.: 15/781,752

(22) PCT Filed: Dec. 6, 2016

(86) PCT No.: PCT/JP2016/086129
§ 371 (c)(1),
(2) Date: Jun. 6, 2018

(87) PCT Pub. No.: WO2017/099045
PCT Pub. Date: Jun. 15, 2017

(65) Prior Publication Data
US 2018/0363802 A1 Dec. 20, 2018

(30) Foreign Application Priority Data
Dec. 8, 2015 (JP) .............................. JP2015-239102

(51) Int. Cl.
F16K 41/04 (2006.01)
F01L 3/08 (2006.01)
F16J 15/3232 (2016.01)

(52) U.S. Cl.
CPC ............... *F16K 41/04* (2013.01); *F01L 3/08* (2013.01); *F16J 15/3232* (2013.01)

(58) Field of Classification Search
CPC .. F01L 3/08; F16K 41/04; F16K 41/08; F16K 41/16; F16J 15/3232; F16J 15/32
See application file for complete search history.

(56) References Cited

U.S. PATENT DOCUMENTS

| 4,695,061 A | * | 9/1987 | Meisner | F01L 3/08 |
| | | | | 123/188.6 |
| 5,478,091 A | * | 12/1995 | Gardner | F16C 1/107 |
| | | | | 270/1.01 |
| 6,045,138 A | * | 4/2000 | Kanzaki | F16J 15/164 |
| | | | | 277/560 |
| 6,123,054 A | * | 9/2000 | Netzer | F16J 15/3212 |
| | | | | 123/188.6 |

(Continued)

FOREIGN PATENT DOCUMENTS

| CN | 2544105 Y | 4/2003 |
| CN | 204002967 U | 12/2014 |

(Continued)

OTHER PUBLICATIONS

Chinese Office Action dated May 20, 2019 with English translations (corresponding to CN2016800715995).

(Continued)

Primary Examiner — Eugene G Byrd
(74) Attorney, Agent, or Firm — Harness, Dickey & Pierce, P.L.C.

(57) ABSTRACT

A valve stem seal with significantly improved sealing performance while improving workability when fitting the valve stem seal to a valve stem guide. An inner peripheral surface of a fitting section 20B is provided with a plurality of annular seal protrusions which respectively include first inclined surfaces 25a and 26a each having a diameter that increases from a radially inward tip toward a seal section 20A side, and second inclined surfaces 25b and 26b each having a diameter that increases from a radially inward tip toward a side opposite to the seal section 20A. The first seal protrusion 25 which is closest to the seal section 20A is configured so that an inclination of the second inclined surface 25b is smaller than that of the first inclined surface 25a, and the second seal protrusion 26 which is farthest from (Continued)

the seal section 20A is configured so that an inclination of the first inclined surface 26*a* is smaller than that of the second inclined surface 26*b*.

2 Claims, 3 Drawing Sheets

(56) References Cited

U.S. PATENT DOCUMENTS

| | | | | |
|---|---|---|---|---|
| 7,299,779 | B2* | 11/2007 | Hegemier | F01L 3/08 |
| | | | | 123/188.6 |
| 10,443,734 | B2* | 10/2019 | Benedix | F16J 15/3268 |
| 2008/0157480 | A1* | 7/2008 | Scarano | F01L 3/08 |
| | | | | 277/402 |
| 2008/0157482 | A1* | 7/2008 | Zoppi | F01L 3/08 |
| | | | | 277/502 |
| 2013/0192555 | A1* | 8/2013 | Nguyen | F01L 3/08 |
| | | | | 123/188.6 |
| 2015/0167850 | A1* | 6/2015 | Zoppi | F16K 1/46 |
| | | | | 251/214 |

FOREIGN PATENT DOCUMENTS

| | | | | |
|---|---|---|---|---|
| EP | 1818514 A1 | | 8/2007 | |
| JP | S60-195912 U | | 12/1985 | |
| JP | H09-068011 A | | 3/1997 | |
| JP | 2001263010 A | * | 9/2001 | ........... F16J 15/3276 |
| JP | 2003-042301 A | | 2/2003 | |
| JP | 2004-176881 A | | 6/2004 | |
| JP | 2007-218282 A | | 8/2007 | |
| JP | 2007298143 A | * | 11/2007 | ........... F16J 15/3276 |
| JP | 2011179606 A | * | 9/2011 | ............... F16J 15/00 |
| JP | 3192572 U | | 8/2014 | |

OTHER PUBLICATIONS

Korean Office Action dated Nov. 14, 2019 with English machine translation (corresponding to KR 10-2018-7015919).

Extended European Search Report dated Jul. 5, 2019 (corresponding to EP16872943.2).

* cited by examiner

VALVE STEM SEAL

CROSS-REFERENCE TO RELATED APPLICATIONS

This application is a National Stage of International Application No. PCT/JP2016/086129, filed Dec. 6, 2016 (now WO 2017/099045A1), which claims priority to Japanese Application No. 2015-239102, filed Dec. 8, 2015. The entire disclosures of each of the above applications are incorporated herein by reference.

FIELD

The present disclosure relates to a valve stem seal fixed to a valve stem guide which guides a valve stem.

BACKGROUND

An intake and exhaust valve system of an internal combustion engine is provided with a valve stem seal for sealing an annular gap between an insertion hole provided in a valve stem guide and a valve stem to be inserted into the insertion hole. A valve stem seal according to a conventional example will be described with reference to FIG. 3. FIG. 3 is a schematic sectional view of the valve stem seal according to the conventional example.

A valve stem (not shown) is configured to be inserted into an insertion hole provided in a valve stem guide (not shown) and to be guided by an inner peripheral surface of the insertion hole. A valve stem seal 500 is provided in order to supply suitable amount of lubricating oil for forming an oil film in an annular gap between the insertion hole provided in the valve stem guide and the valve stem while sealing lubricating oil in a lubricating oil chamber.

The valve stem seal 500 according to the conventional example includes a reinforcement ring 510 and a rubber-like elastic body 520 integrally provided with the reinforcement ring 510. The rubber-like elastic body 520 includes a seal section 520A which is slidable on the valve stem and a fitting section 520B which is provided on an inner peripheral surface side of a cylindrical body section in the reinforcement ring 510 and which is fitted and fixed to the valve stem guide.

In the conventional example, a plurality of annular seal protrusions 521 are provided on an inner peripheral surface of the fitting section 520B in order to improve sealing performance while improving workability when fitting the valve stem seal 500 to the valve stem guide. The seal protrusions 521 include a first inclined surface 521a having a diameter that increases from a radially inward tip toward the seal section 520A and a second inclined surface 521b having a diameter that increases from a radially inward tip opposite the seal section 520A (refer to enlarged view of the seal protrusion 521 in FIG. 3). The first inclined surface 521a and the second inclined surface 521b are designed so that inclinations thereof are equal to one another. With the plurality of seal protrusions 521 configured as described above, penetration of oil (lubricating oil) from a lubricating oil chamber side toward an intake port or an exhaust port can be suppressed while gas leakage from the intake port side or the exhaust port side toward the lubricating oil chamber can be suppressed.

However, intake and exhaust pressure (port pressure) of turbo engines and engines with EGR system of recent years has increased. Accordingly, the valve stem seal 500 according to the conventional example is no longer capable of sufficiently preventing gas from leaking from the intake port side or the exhaust port side toward the lubricating oil chamber.

CITATION LIST

Patent Literature

[PTL 1] Japanese Patent Application Laid-open No. 2004-176881

SUMMARY

Technical Problem

An object of the present disclosure is to provide a valve stem seal with significantly improved sealing performance while improving workability when fitting the valve stem seal to a valve stem guide.

Solution to Problem

In order to solve the problem described above, the present disclosure adopts the following means.

Specifically, a valve stem seal according to the present disclosure is a valve stem seal which includes: a reinforcement ring having a tubular body section; and a rubber-like elastic body which is integrally provided with the reinforcement ring, the valve stem seal being configured to be fixed to a valve stem guide that guides a valve stem, wherein the rubber-like elastic body includes: a seal section which is slidable on the valve stem; and a fitting section which is provided on an inner peripheral surface of the body section and which is configured to be fitted and fixed to the valve stem guide, an inner peripheral surface of the fitting section is provided with a plurality of annular seal protrusions, each including a first inclined surface having a diameter that increases from a radially inward tip toward the seal section and a second inclined surface having a diameter that increases from the radially inward tip toward a side opposite to the seal section, and among the plurality of seal protrusions, the first seal protrusion which is closest to the seal section is configured so that an inclination of the second inclined surface is smaller than that of the first inclined surface, and the second seal protrusion which is farthest from the seal section is configured so that an inclination of the first inclined surface is smaller than that of the second inclined surface.

Another valve stem seal according to the present disclosure is a valve stem seal which includes: a reinforcement ring having a tubular body section; and a rubber-like elastic body which is integrally provided with the reinforcement ring, the valve stem seal being configured to be fixed to a valve stem guide that guides a valve stem, wherein the rubber-like elastic body includes: a seal section which is slidable on the valve stem; and a fitting section which is provided on an inner peripheral surface of the body section and which is configured to be fitted and fixed to the valve stem guide, an inner peripheral surface of the fitting section is provided with a plurality of annular seal protrusions, each including a first inclined surface having a diameter that increases from a radially inward tip toward the seal section and a second inclined surface having a diameter that increases from a radially inward tip toward a side opposite to the seal section, and among the plurality of seal protrusions, at least one first seal protrusion arranged on the seal section side is configured so that an inclination of the second inclined surface is smaller than that of the first inclined surface, and among the plurality of seal protrusions, at least one second seal protrusion arranged on a side opposite to the seal section with respect to a region where the first seal protrusion is arranged is configured so that an inclination of the first inclined surface is smaller than that of the second inclined surface.

In the present disclosure, the first seal protrusions are configured so that the inclination of the second inclined surface is smaller than that of the first inclined surface. Therefore, surface pressure by the first seal protrusions against the valve stem guide peaks at a position biased toward the seal section. Due to the first seal protrusions configured as described above, gas leakage from the seal section side toward a side opposite to the seal section can be effectively suppressed.

The second seal protrusions are configured so that an inclination of the first inclined surface is smaller than that of the second inclined surface. Therefore, surface pressure by the second seal protrusions against the valve stem guide peaks at a position biased toward a side opposite to the seal section. Due to the second seal protrusions configured as described above, penetration of oil (lubricating oil) from the opposite side to the seal section toward the seal section can be effectively suppressed.

As described above, in the present disclosure, gas leakage can be effectively suppressed by the first seal protrusions arranged on the side of the seal section and penetration of oil can be effectively suppressed by the second seal protrusions arranged on an opposite side to the seal section. Since a plurality of seal protrusions are provided on the inner peripheral surface of the fitting section, workability when fitting the valve stem seal to the valve stem guide can be improved.

Advantageous Effects of the Disclosure

As described above, according to the present disclosure, sealing performance of a valve stem seal can be significantly improved while improving workability when fitting the valve stem seal to a valve stem guide.

DRAWINGS

DETAILED DESCRIPTION

Hereinafter, a mode for implementing the present disclosure will be described in detail by way of example of an embodiment with reference to the drawings. However, it is to be understood that dimensions, materials, shapes, relative arrangements, and the like of components described in the embodiment are not intended to limit the scope of the disclosure thereto unless otherwise specifically noted.

Embodiment

Figure 1:
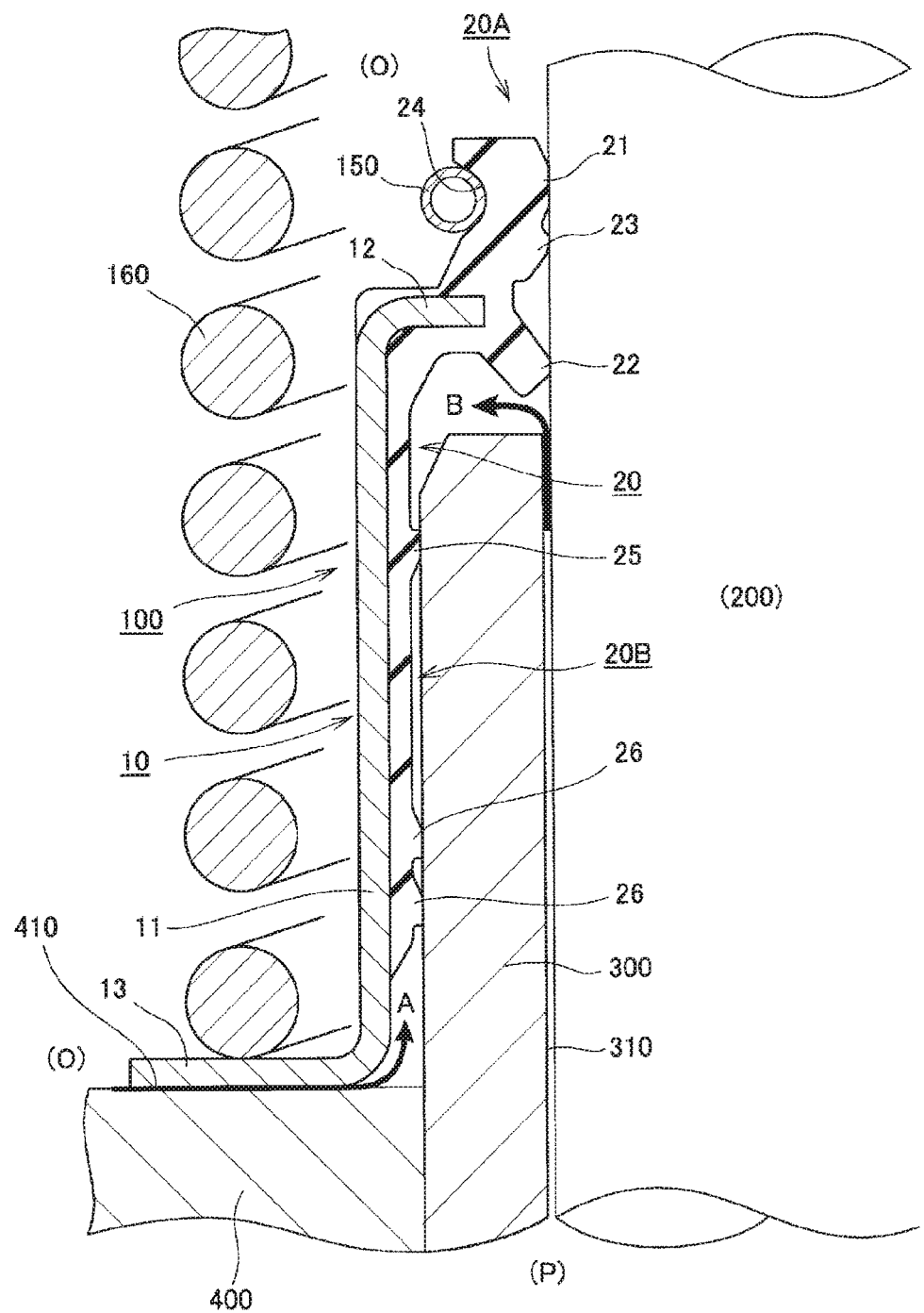
FIG. 1 is a schematic sectional view showing a state where a valve stem seal according to an embodiment of the present disclosure is in use.
Figure 2:
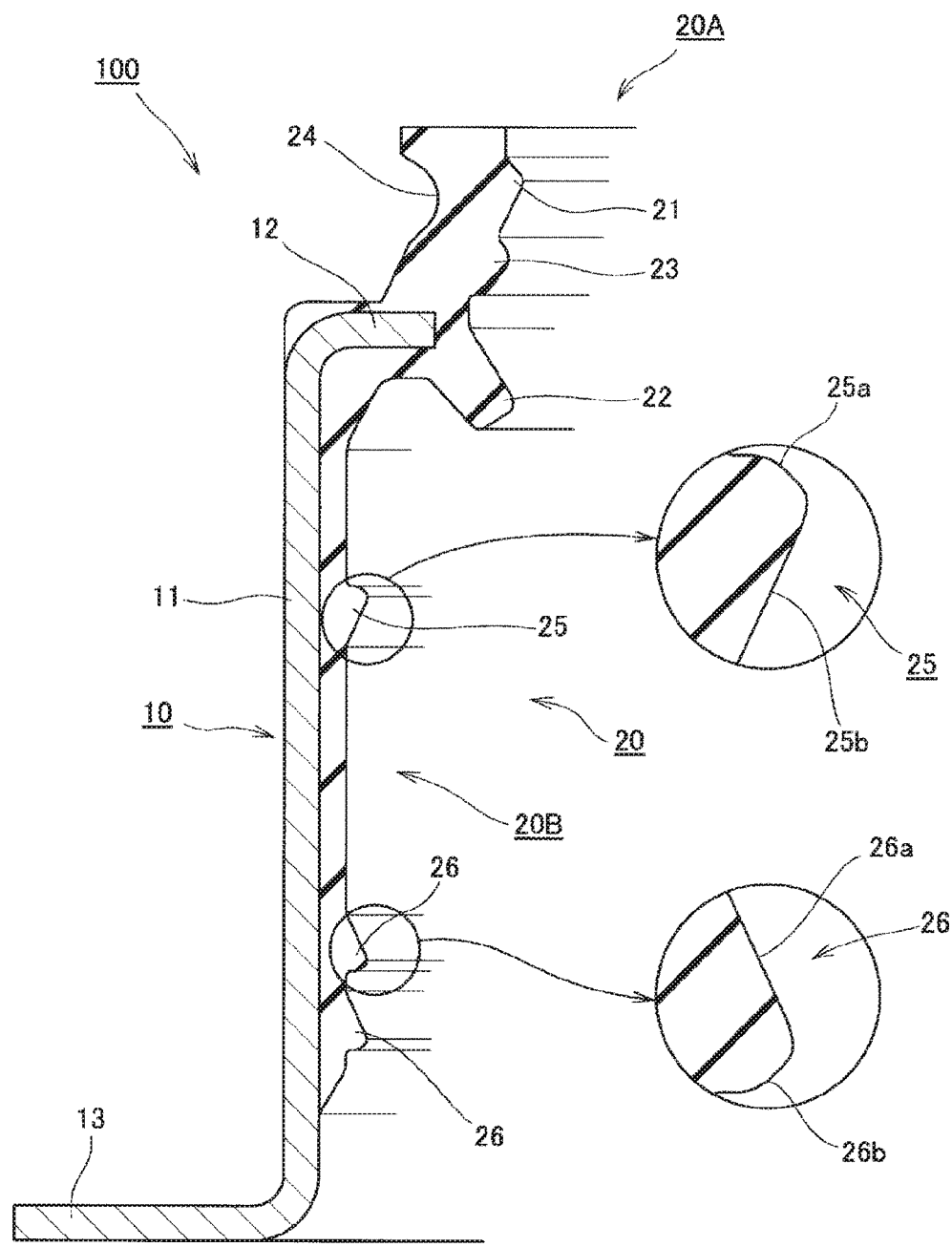
FIG. 2 is a schematic sectional view of the valve stem seal according to the embodiment of the present disclosure.
Figure 3:
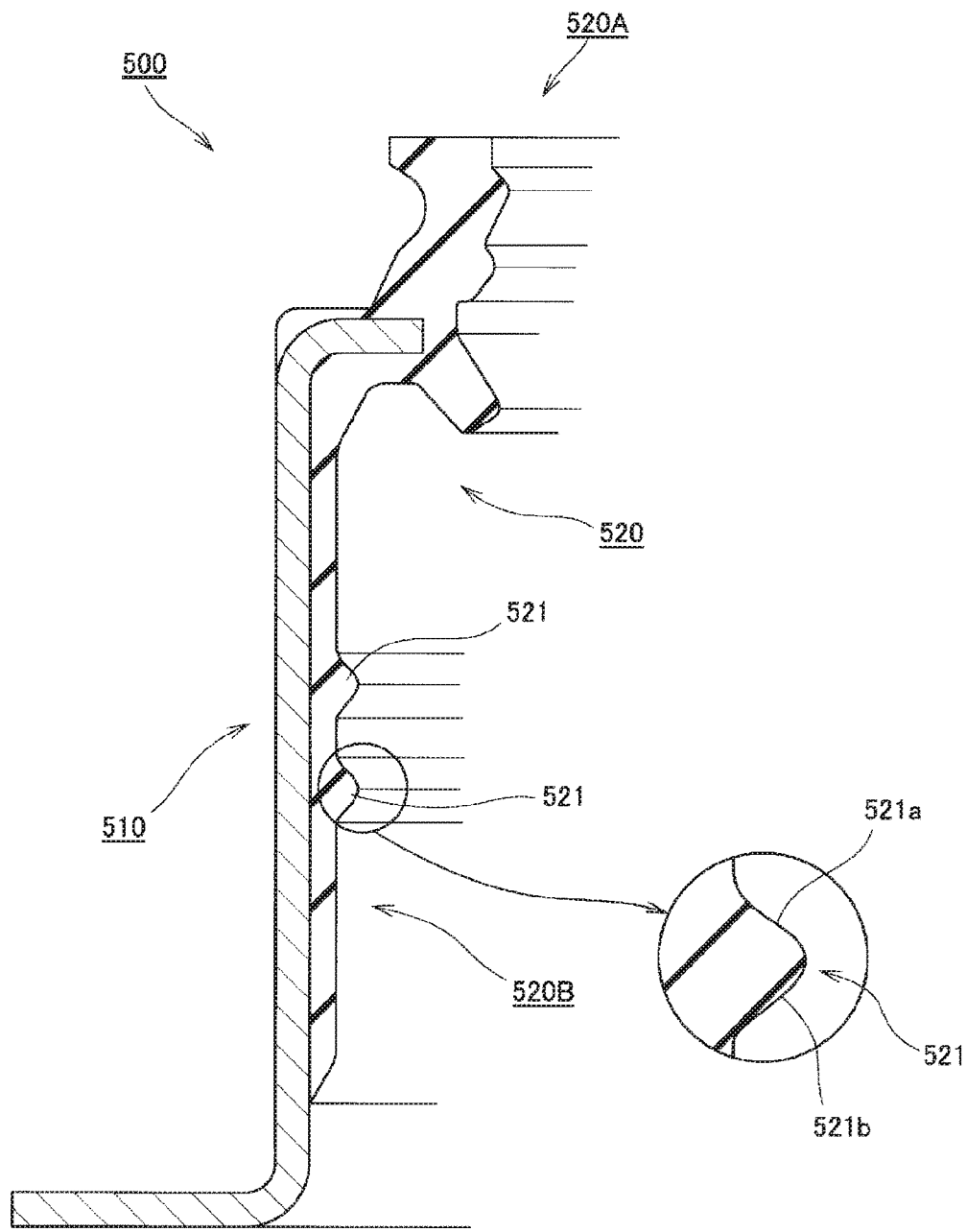
FIG. 3 is a schematic sectional view of a valve stem seal according to a conventional example.

A valve stem seal according to an embodiment of the present disclosure will be described with reference to FIGS. 1 and 2. FIG. 1 is a schematic sectional view showing a state where a valve stem seal according to an embodiment of the present disclosure is in use. It should be noted that FIG. 1 shows a state where the valve stem seal is fixed to a valve stem guide. The valve stem seal and the like in FIG. 1 represent partial sections cut by a plane including a central axis of the valve stem seal. FIG. 2 is a schematic sectional view of the valve stem seal according to the embodiment of the present disclosure. It should be noted that the valve stem seal has a rotationally symmetrical shape and, in FIG. 2, only half of sections cut by a plane including the central axis of the valve stem seal is shown. In addition, FIG. 2 also shows enlarged views of seal protrusions.

<Overall Configuration of Sealing Structure>

An overall configuration of a sealing structure including a valve stem seal according to the present embodiment will be described particularly with reference to FIG. 1. A valve stem guide 300 is mounted to a cylinder head 400 of an engine. A valve stem 200 is provided so as to be inserted into an insertion hole 310 provided in the valve stem guide 300 and to be guided by an inner peripheral surface of the insertion hole 310. In the diagram, (O) denotes a lubricating oil chamber side and (P) denotes a port side (an intake port side or an exhaust port side). A valve stem seal 100 is provided in order to supply suitable amount of lubricating oil for forming an oil film in an annular gap between the insertion hole 310 provided in the valve stem guide 300 and the valve stem 200 while sealing lubricating oil in a lubricating oil chamber.

<Valve Stem Seal>

The valve stem seal 100 according to the present embodiment will now be described in detail. The valve stem seal 100 includes a reinforcement ring 10 and a rubber-like elastic body 20 which is integrally provided with the reinforcement ring 10. The reinforcement ring 10 and the rubber-like elastic body 20 can be integrated by integral molding. For example, by performing insert molding of the rubber-like elastic body 20 using the reinforcement ring 10 as an insert, the rubber-like elastic body 20 can be integrally provided with respect to the reinforcement ring 10. The reinforcement ring 10 is made of metal or the like. The reinforcement ring 10 is constituted by a tubular (more specifically, cylindrical) body section 11, an inward flange part 12 provided on one end of the body section 11, and an outward flange part 13 provided on another end of the body section 11.

The rubber-like elastic body 20 includes a seal section 20A which is slidable on the valve stem 200 and a fitting section 20B which is provided on an inner peripheral surface side of the body section 11 and which is fitted and fixed to the valve stem guide 300.

The seal section 20A is provided near a tip of the inward flange part 12 of the reinforcement ring 10. The seal section 20A includes a main lip 21 provided on a lubricating oil chamber side (O), a back-pressure lip 22 provided on a port side (P), and an auxiliary lip 23 provided near a base of the main lip 21. An annular recess 24 is provided on an outer peripheral surface side of the main lip 21. A garter spring 150 which presses the main lip 21 against the valve stem 200 is mounted to the annular recess 24 (refer to FIG. 1). A plurality of annular seal protrusions (in the present embodiment, one first seal protrusion 25 and two second seal protrusions 26) are provided on an inner peripheral surface of the fitting section 20B.

The valve stem seal 100 configured as described above is fixed to the valve stem guide 300 as the fitting section 20B is fitted to the valve stem guide 300 from the outward flange part 13 side of the reinforcement ring 10. The outward flange part 13 of the reinforcement ring 10 becomes adhered to a top surface 410 of the cylinder head 400. In the present embodiment, the outward flange part 13 is configured to be pressed against the top surface 410 of the cylinder head 400 by a valve spring 160. Accordingly, the valve stem seal 100 is prevented from detaching from the valve stem guide 300 by intake and exhaust pressure (port pressure).

In the valve stem seal 100 configured as described above, penetration of oil (lubricating oil) from the lubricating oil chamber side (O) to the port side (P) is suppressed by the main lip 21 in the seal section 20A. Gas leakage from the port side (P) to the lubricating oil chamber side (O) is suppressed by the back-pressure lip 22 in the seal section 20A. Penetration of oil and gas leakage from an annular gap between the fitting section 20B of the valve stem seal 100 and the valve stem guide 300 can be suppressed by the plurality of annular seal protrusions (the first seal protrusion 25 and the second seal protrusions 26) provided on the inner peripheral surface of the fitting section 20B. Penetration of oil (refer to an arrow A in FIG. 1) having entered from between the top surface 410 of the cylinder head 400 and the outward flange part 13 of the reinforcement ring 10 can be suppressed by the plurality of seal protrusions described above. Leakage of gas (refer to an arrow B in FIG. 1) discharged from between the valve stem 200 and the valve stem guide 300 can be suppressed by the plurality of seal protrusions described above.

<Seal Protrusions>

The seal protrusions according to the present embodiment will now be described in greater detail. The seal protrusions according to the present embodiment are constituted by the first seal protrusion 25 and the second seal protrusions 26. The first seal protrusion 25 is arranged on the seal section 20A side and the second seal protrusions 26 are arranged on a side opposite to the seal section 20A side with respect to a region in which the first seal protrusion 25 is arranged. Therefore, it is obvious that the seal protrusion closest to the seal section 20A among the plurality of seal protrusions is the first seal protrusion 25 and that the seal protrusion farthest from the seal section 20A among the plurality of seal protrusions are the second seal protrusions 26. In the present embodiment, only one first seal protrusion 25 arranged on the seal section 20A side is provided while two second seal protrusions 26 arranged on the side opposite to the seal section 20A side are provided. The two second seal protrusions 26 are designed so as to have same shapes and dimensions. A configuration is adopted in which an interval between the regions in which the first seal protrusion 25 is arranged and a region in which the second seal protrusions 26 are arranged is sufficiently wider than an interval between the two second seal protrusions 26.

Each of the seal protrusions (the first seal protrusion 25 and the second seal protrusions 26) has a first inclined surface (25a and 26a) having a diameter that increases from a radially inward tip toward the seal section 20A, and a second inclined surface (25b and 26b) having a diameter that increases from a radially inward tip opposite the seal section 20A.

The first seal protrusion 25 is configured so that an inclination of the second inclined surface 25b is smaller than that of the first inclined surface 25a. In contrast, the two second seal protrusions 26 are both configured so that an inclination of the first inclined surface 26a is smaller than that of the second inclined surface 26b.

<Advantages of Valve Stem Seal According to Present Embodiment>

With the valve stem seal 100 according to the present embodiment, the first seal protrusion 25 is configured so that an inclination of the second inclined surface 25b is smaller than that of the first inclined surface 25a. Therefore, surface pressure by the first seal protrusion 25 against the valve stem guide 300 peaks at a position biased toward the seal section 20A. Due to the first seal protrusion 25 configured as described above, gas leakage from the seal section 20A side toward a side opposite to the seal section 20A can be effectively suppressed.

The second seal protrusions 26 are configured so that an inclination of the first inclined surface 26a is smaller than that of the second inclined surface 26b. Therefore, surface pressure by the second seal protrusions 26 against the valve stem guide 300 peaks at a position biased toward the side opposite to the seal section 20A. Due to the second seal protrusions 26 configured as described above, penetration of oil (lubricating oil) from the side opposite to the seal section 20A toward the seal section 20A can be effectively suppressed.

As described above, in the valve stem seal 100 according to the present embodiment, gas leakage can be effectively suppressed by the first seal protrusion 25 arranged on the seal section 20A side and penetration of oil can be effectively suppressed by the second seal protrusions 26 arranged on the side opposite to the seal section 20A. Since a plurality of seal protrusions (the first seal protrusion 25 and the second seal protrusions 26) are provided on the inner peripheral surface of the fitting section 20B, workability when fitting the valve stem seal 100 to the valve stem guide 300 can be improved.

(Other)

The above described valve stem seal 100 according to the present embodiment includes one first seal protrusion 25 in which the inclination of the second inclined surface 25b is smaller than that of the first inclined surface 25a and two second seal protrusions 26 that in which the inclination of the first inclined surface 26a is smaller than that of the second inclined surface 26b. However, in a valve stem seal according to the present disclosure, if at least one first seal protrusion and at least one second seal protrusion are provided, the number of first seal protrusions and the number of second seal protrusions configured as described above are not limited to the above described example. For example, such a configuration may be adapted in which two first seal protrusions 25 are provided on the seal section 20A side and one second seal protrusion 26 is provided on the side opposite to the seal section 20A with respect to a region in which the two first seal protrusions 25 are arranged. Such a configuration may also be adapted in which two first seal protrusions 25 are provided on the seal section 20A side and two second seal protrusions 26 are provided on the side opposite to the seal section 20A with respect to a region in which the two first seal protrusions 25 are arranged.

REFERENCE SIGNS LIST

10 Reinforcement ring
11 Body section
12 Inward flange part
13 Outward flange part
20 Rubber-like elastic body
20A Seal section
20B Fitting section
21 Main lip
22 Back-pressure lip
23 Auxiliary lip 24 Annular recess
25 First seal protrusion
26 Second seal protrusion
25a, 26a First inclined surface
25b, 26b Second inclined surface
100 Valve stem seal
150 Garter spring
160 Valve spring
200 Valve stem
300 Valve stem guide
310 Insertion hole
400 Cylinder head
410 Top surface

The invention claimed is:

1. A valve stem seal comprising:
a reinforcement ring having a tubular body section; and
a rubber-like elastic body which is integrally provided with the reinforcement ring,
the valve stem seal being configured to be fixed to a valve stem guide that guides a valve stem, wherein
the rubber-like elastic body includes:
a seal section which is slidable on the valve stem; and
a fitting section which is provided on an inner peripheral surface of the body section and which is configured to be fitted and fixed to the valve stem guide,
an inner peripheral surface of the fitting section is provided with a plurality of annular seal protrusions, each including a first inclined surface having a diameter that increases from a radially inward tip toward the seal section and a second inclined surface having a diameter that increases from the radially inward tip toward a side opposite to the seal section, and
among the plurality of seal protrusions, the first seal protrusion which is closest to the seal section is configured so that an inclination of the second inclined surface is smaller than that of the first inclined surface, and the second seal protrusion which is farthest from the seal section is configured so that an inclination of the first inclined surface is smaller than that of the second inclined surface.

2. A valve stem seal comprising:
a reinforcement ring having a tubular body section; and
a rubber-like elastic body which is integrally provided with the reinforcement ring,
the valve stem seal being configured to be fixed to a valve stem guide that guides a valve stem, wherein
the rubber-like elastic body includes:
a seal section which is slidable on the valve stem; and
a fitting section which is provided on an inner peripheral surface of the body section and which is configured to be fitted and fixed to the valve stem guide,
an inner peripheral surface of the fitting section is provided with a plurality of annular seal protrusions, each including a first inclined surface having a diameter that increases from a radially inward tip toward the seal section and a second inclined surface having a diameter that increases from a radially inward tip toward a side opposite to the seal section, and
among the plurality of seal protrusions, at least one first seal protrusion arranged on the seal section side is configured so that an inclination of the second inclined surface is smaller than that of the first inclined surface, and among the plurality of seal protrusions, at least one second seal protrusion arranged on a side opposite to the seal section with respect to a region where the first seal protrusion is arranged is configured so that an inclination of the first inclined surface is smaller than that of the second inclined surface.

* * * * *